United States Patent Office 3,002,961
Patented Oct. 3, 1961

3,002,961
PROCESS FOR THE PREPARATION OF PROPYLENE OF HIGH MOLECULAR WEIGHT
Hans Günter Kirschner, Albert Gustav Martin Gumboldt, and Gerhard Bier, all of Frankfurt am Main, Germany, assignors to Farbwerke Hoechst Aktiengesellschaft vormals Meister Lucius & Bruning, Frankfurt am Main, Germany, a corporation of Germany
No Drawing. Filed Oct. 16, 1956, Ser. No. 616,128
Claims priority, application Germany Oct. 21, 1955
4 Claims. (Cl. 260—93.7)

This invention relates to a process of polymerizing olefins and, more particularly, to an improved process of preparing polyolefins by a low-pressure process.

In Belgian Patent 533,362, in Belgian Patent 534,792, in Belgian Patent 534,888, and in Belgian Patent 540,459, all of which patent applications were filed by Karl Ziegler, there is described a process for the preparation of high molecular weight polyethylenes. By the process described in these patents, an olefin such as ethylene is contacted under relatively mild conditions of pressure and temperature with an alkali metal, alkaline earth metal, or earth metal organometallic compound in combination with a compound of a metal of groups IV–B, V–B, VI–B or VIII of the periodic table as, for example, salts of titanium, zirconium, hafnium, vanadium, niobium, tantalum, chromium, molybdenum, tungsten, thorium, and uranium. Mixtures of organoaluminum compounds and titanium tetrahalides or zirconium tetrahalides have proved to be especially efficacious for starting the polymerization. The polymerization is carried out in inert dispersing agents, for example, hydrogenated Fischer-Tropsch diesel oil, gasoline, hexane, paraffin oil, benzene, chlorobenzene, etc.

The polymerization of propylene according to the low pressure process can be carried out in a manner analogous to the polymerization of ethylene, for example, in hydrogenated diesel oil. This method has certain disadvantages. First of all, the dispersing agent strongly adheres to the polymer. Thus, a complicated processing is necessary after the polymer has been separated from the dispersing agent (for example, by filtration). In many instances, a certain portion of the polypropylene is soluble in the dispersing agent. When this method is used, the soluble portion consists mainly of amorphous polymers, while the polymer separated by filtration is for the most part crystalline. The soluble polymer portion increases the viscosity of the mixture which can therefore be agitated only with difficulty. Since the mixture is highly viscous, the heat of polymerization in large industrial units is difficult to remove. Furthermore, considerable difficulties arise when the highly viscous mixture is filtered. To summarize: The polymerization of propylene at ordinary pressure or low pressures such as 2–40 atm. gage in gasoline or high-boiling similar hydrocarbons involves considerable difficulties.

According to unpublished work, the polymerization of propylene may be carried out also without a dispersing agent and examples are given illustrating the polymerization in the presence of relatively small amounts of dispersing agents partially introduced into the autoclave with the catalyst. According to the examples, the conversion obtained in the polymerization of propylene was high. However, considerable difficulties arise when the process is carried out on a commercial scale. A solid cake which can hardly be agitated results from the reaction. The heat of polymerization cannot therefore be sufficiently removed. The removal of the polymer from large reaction units and the processing of the cake, varying from solid to highly viscous, is connected with tedious manual labor or requires a large technical outlay.

It has now been found that olefins, and particularly propylene, may be polymerized with catalysts according to the low-pressure process by carrying out the polymerization of, for example, propylene, in the liquid phase with propylene as the preferred dispersing agent. Under the conditions of the invention, the reaction mixture consisting of polypropylene and propylene remains in a form in which it can easily be agitated. The reaction is preferably carried out in such a manner that a conversion of from about 30% to about 60% is obtained, although conversions of from about 10% up to essentially 100% are possible.

The ease with which the mixture can be agitated depends in part on the low viscosity of the monomeric propylene and partly on the low density of the liquid propylene monomer. The latter has a density of 0.52 and is a considerably better dispersing agent from the economical point of view than a dispersing agent with a density of 0.8. The use of liquid propylene as dispersing agent affords another advantage. The total heat of polymerization or at least a considerable part of it can be removed by way of the reflux condenser; thus, the polymerization of propylene can be carried out within short periods even in the largest commercial units in which cooling through the walls alone requires much time. It is most surprising that the amount of soluble portions formed according to the process of the invention is considerably smaller than in the process mentioned above which is carried out in the presence of other dispersing agents. Furthermore, in accordance with this invention, it is possible to obtain products with higher molecular weights than according to the processes which are carried out in the presence of dispersing agents, such as have been suggested before.

The catalyst may be prepared separately in an inert dispersing agent such as aliphatic hydrocarbons boiling between 30° C. and 250° C. and then introduced into the autoclave. It is thus possible to introduce the total catalyst mixture (for example, consisting of the titanium and aluminum compounds) into the autoclave or, the catalyst which consists mainly of an insoluble titanium compound can be placed in the autoclave in the isolated state as described in U.S. patent application Serial No. 553,412 of December 16, 1955, and the additionally required amount of the aluminum compound as, for example, diethylaluminumchloride, can then be added. The isolated catalyst which was prepared in an inert solvent can be filtered, washed, taken up with propylene and then introduced with liquid propylene into the reaction vessel.

The process has the advantage that no other dispersing agent aside from propylene is present during the reaction; the processing is therefore considerably facilitated. A modification of the process of the invention is that the starting components of the catalyst, for example, titanium tetrachloride and an alkylaluminum compound, undergo a reaction in liquid propylene in the reaction vessel. The result is the production of highly active catalysts which make short reaction times possible or enable to use smaller amounts. By this method a larger amount of the amorphous polymer may be produced. Another modification of the process of this invention is that the total catalyst or the desired amount of one or two of its components is added during the polymerization. This affords good means of controlling the reaction. Furthermore, it is possible to introduce all components as, for example, the titanium compound, aluminum compound, and the monomer, into the reaction vessel in a continuous or intermittent operation.

The course of the polymerization can be followed by the generation of heat or determined by the increasing requirement of power for the agitation. Since a considerable contraction of volume occurs in going from the monomeric propylene to polymeric propylene, it may be desirable to add new propylene monomer during the polymerization.

The polymerization is possible over a wide temperature range. In general, it is carried out between −40° C. and +100° C., preferably between +10° C. and +60° C. The choice of the catalyst system, particularly the ratio of the components, depends, in addition to temperature, on the molecular weight desired, the velocity of the polymerization, and the ratio of crystalline to amorphous polypropylene desired. The polymerization can be carried out as a discontinuous, intermittent, or continuous process.

When the polymerization has reached the desired extent of conversion as, for example, 40%, the processing can be carried out in several ways. The monomeric propylene can be distilled from the polymer batch and condensed in the receiver. The polypropylene which ranges from a grainy to a lumpy substance can be removed from the autoclave through an opening. Another way of removing the polypropylene from the autoclave is to introduce a dispersing agent for the polypropylene as, for example, an aliphatic hydrocarbon boiling between 30° C. and 220° C. into the autoclave during or after the distillation of the monomeric propylene and removing the highly viscous mixture in the usual manner. A particularly suitable method of removing the polymer consists in passing the mixture of polypropylene and propylene from the autoclave through a pressure filter and thus obtaining a separation of the monomeric and polymeric propylene. A certain portion of the soluble amorphous polymer and of the soluble catalyst constituents remains dissolved in the liquid propylene. The soluble polymer can be isolated by the evaporation of the propylene or the addition of a precipitant.

Further processing of the isolated polypropylene and the removal of residual catalyst can be carried out by any desired means. An aftertreatment with solvents such as gasoline, acetone, alcohol or aqueous solutions of acids or bases can be used or, it is possible to use a combination of organic and aqueous substances which contain pH-controlling substances.

The process of the invention can be extended also to copolymers of propylene with, for example, other olefins such as ethylene, isobutylene, 1-butylene, 1-octene, styrene, and styrene derivatives.

The polymers and copolymers may find application in the field of plastics, rubber, and lacquer. The properties are influenced by the composition of the polymer, structure, and the molecular weight. It is noteworthy that polypropylene exists in at least two modifications. One form is highly crystalline, while the other is amorphous. The amorphous modification is more soluble than the crystalline, the viscosity remaining the same. A mixture of the crystalline and amorphous products is advantageous for many applications. A product containing mainly crystalline polypropylene and a few percent amorphous polypropylene is suitable, for example, for the preparation of tubes and sheets.

The workability of such a mixture is good, the ultimate elongation is favorable, and the stability and tendency to become brittle are better than those of the 100% crystalline polypropylene. The process can be extended also to the polymerization of other unsaturated monomers. The process of the invention can be carried out at atmospheric pressure, at low pressures to 50 atmospheres gage, or at high pressures.

*Example 1*

An autoclave of 125 ml. capacity was cooled to −70° C. in an acetone-carbon dioxide bath and charged with 21 g. (0.5 mole) of liquid propylene. Two ml. of a TiCl₃ suspension which contains 0.3 mole/liter of TiCl₃ in a fraction of hydrogenated petroleum hydrocarbon boiling between 200° C. and 250° C. was added while dry, oxygen-free nitrogen was passed over. A solution consisting of 0.14 g. triethylaluminum (1.2 mmoles) and 4.2 g. propylene (0.1 mole) was prepared under nitrogen in a Schlenk tube cooled to a low temperature and then added to the contents of the autoclave. The mixture was heated for 4 hours at 60–70° C. with agitation, allowed to cool, the gaseous propylene was blown off, and the contents of the autoclave rinsed with 50 ml. of isopropanol. The mixture was carefully triturated, filtered under suction, and triturated once more with 100 ml. of 1% sodium hydroxide. After the washings showed a neutral reaction, the mixture was dried at 70° C. under a vacuum; 11.9 g. (47% of the theoretical yield) of a powdery polymeric propylene which was slightly yellow was obtained; η spec./c.=2.2 (measured in an 0.5% solution of tetrahydronaphthalene at 130° C.).

*Example 2*

A stainless steel autoclave of 5 liter capacity equipped with an anchor stirrer and a reflux condenser and flushed with nitrogen was charged with 30 mmoles of isolated catalyst (TiCl₃), for example, prepared according to the process described in U.S. patent application Serial No. 553,412, of December 16, 1955, in 50 ml. of a hydrogenated petroleum hydrocarbon and 75 mmoles of triethylaluminum was added. Two thousand ml. of liquid propylene (1030 g. was then pressed in through a charging valve and the agitation started. The reaction set in within a few minutes. The temperature of the cooling water in the jacket was from 18 to 19° C. and thus an internal temperature of 20–21° C. was obtained without additional cooling at the reflux condenser. The pressure remained constant at 9.6–9.8 atmospheres throughout the entire experiment. After 2½ hours, the unreacted propylene (780 g.) was blown off, condensed in a trap, and used for the next batch. The polymer remaining in the autoclave was agitated with 2 liters of gasoline (boiling range 40–80° C.), removed from the autoclave, filtered, and the catalyst eliminated by dissolving it in the acidified solution with agitation and the addition of an emulsifier. After washing, filtering, and drying, 134 g. of a fine, friable powder, which can be processed into clear films, was obtained. The specific viscosity η spec./c. was 5.5. An additional 31 g. of amorphous polypropylene was precipitated from the gasoline filtrate by adding isopropanol.

*Example 3*

Thirty mmoles of isolated catalyst in 50 ml. of a hydrogenated petroleum hydrocarbon and 90 mmoles of triethylaluminum were placed in the autoclave and 2000 ml. of liquid propylene pressed in as in Example 2. The temperature was maintained at 30–40° C.; the experiment was discontinued after 1 hour by blowing off the unreacted propylene. The processing was carried out by using 2½ liters of gasoline as indicated in Example 2. The yield of crystalline polypropylene amounted to 254 g.; the polypropylene was again in the form of a fine white powder (η spec./c.=3.8). Sixty-seven g. of amorphous polypropylene was precipitated from the gasoline filtrate by isopropanol.

*Example 4*

An autoclave was charged with 30 mmoles of isolated catalyst in 50 ml. of a hydrogenated petroleum hydrocarbon, 80 mmoles of diethylaluminum monochloride, and 2000 ml. of liquid propylene as described in Example 2. The temperature was gradually raised from 20 to 40° C. within 3.5 hours. When the pressure of 15.2 atmospheres (at 40° C.) began to drop, outgassing was carried out and 356 g. of propylene recovered. The polymer was removed from the autoclave and agitated for 45 minutes with 3 liters of gasoline (boiling range 40–80° C.). Subsequent filtration was particularly easy. The filter residue and the filtrate were processed as in Example 2. The yield of the crystalline product amounted to 610 g. of a white powder ($\eta$ spec./c.=26.2), which can be compressed into good foils at 185° C. The amorphous polypropylene precipitate from the gasoline filtrate amounted to 57 g.

What we claim and desire to protect by Letters Patent is:

1. An improved process of polymerizing propylene which comprises contacting liquid propylene with a catalytic amount of a catalyst formed by mixing an alkyl-aluminum compound selected from the group consisting of an aluminum trialkyl, a dialkylmonoaluminum halide, and a monoalkylaluminum dihalide, with a titanium halide in a ratio of 0.5–12 moles of alkylaluminum per 1 mole of a halogen compound of titanium, employing as the dispersing agent liquid propylene, and maintaining sufficient liquid propylene in the reaction mixture to function as a diluent for the resulting polymer by restricting the polymerization of the batch to a conversion of 30–60% of the total propylene introduced, so that the reaction mixture of propylene and polymer can be easily agitated.

2. The process of claim 1 wherein the titanium halide is the titanium trichloride obtained on mixing diethylaluminum-monochloride with titanium tetrachloride in an inert hydrocarbon dispersing agent, separating the insoluble titanium trichloride and resuspending it in liquid propylene prior to use in the polymerization system.

3. The process of claim 1 wherein the titanium halide is the titanium trichloride obtained on mixing triethylaluminum with titanium tetrachloride in an inert hydrocarbon dispersing agent, separating the insoluble titanium trichloride and resuspending it in liquid propylene prior to use in the polymerization system.

4. The process of claim 3 wherein the titanium trichloride is prepared in liquid poypropylene as the inert dispersing agent.

References Cited in the file of this patent
UNITED STATES PATENTS

| | | |
|---|---|---|
| 2,824,089 | Peters | Feb. 18, 1958 |
| 2,827,446 | Breslow | Mar. 18, 1958 |

FOREIGN PATENTS

| | | |
|---|---|---|
| 534,792 | Belgium | Jan. 31, 1955 |
| 526,101 | Italy | May 14, 1955 |
| 538,782 | Belgium | Dec. 6, 1955 |

OTHER REFERENCES

D'Alelio: Fundamental Principles of Polymerization, pages 352–360, John Wiley (1952).

Natta: La Chimica E L'Industria, pages 888–900, vol. XXXVII, No. 11, 1955 (July 28, 1955).